Oct. 7, 1958     E. KREISSIG ET AL     2,855,228
CONNECTION MEANS

Filed Feb. 9, 1954     2 Sheets-Sheet 1

Inventors:
Ernst Kreissig
& Oskar E. Peter
By their attorney
John F. C. Glenn

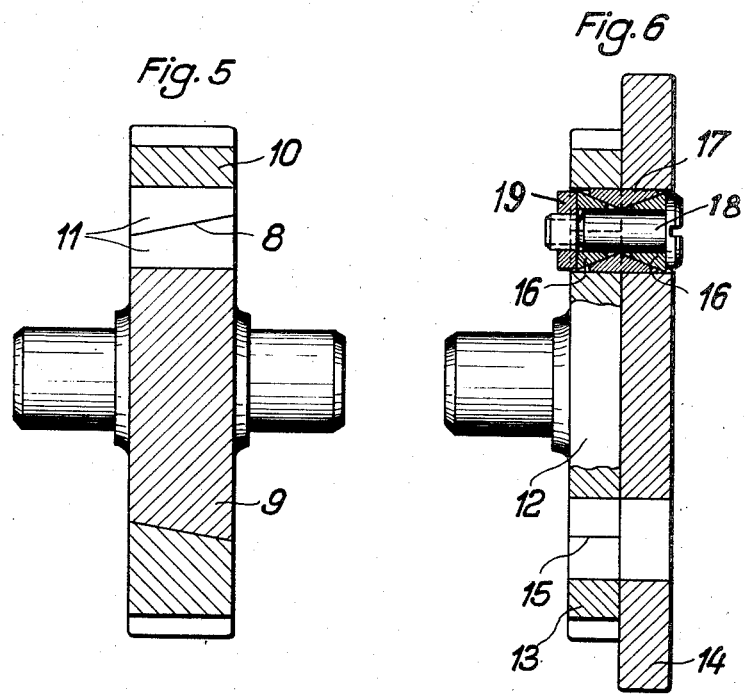

United States Patent Office 2,855,228
Patented Oct. 7, 1958

2,855,228

CONNECTION MEANS

Ernst Kreissig and Oskar E. Peter, Krefeld, Uerdigen, Germany

Application February 9, 1954, Serial No. 409,210

Claims priority application Germany February 12, 1953

4 Claims. (Cl. 287—52)

This invention relates to means for connecting bodies rotating about a common axis, the connection means being stressed primarily by compression or shearing forces, or both such forces at once.

For purposes of modern machinery it is important to connect parts rotatable about a common axis, such as a shaft and gear or a shaft and wheel body, in such manner that there is no play between the connecting parts, because modern increased speeds and shock stresses raise a serious danger of rapid destruction through any play whatever between the connection means and the members to be connected. The dangers of fitting play are unavoidable with conventional connections of the kind in question, such as notched gears, multiple-keyed shaft gears and the like, since not all parts of the connecting means are uniformly loaded and hence individual portions of the connecting means are over-stressed. For such portions there is a danger of premature destruction, which in turn leads to destruction of the other parts of the assembly. Furthermore, air can enter where there is any play, and the rust which it causes, coupled with the over-stress of certain portions of the connection, tends to corrode and rapidly weaken the whole connection, with resultant accelerated deterioration of the whole assembly.

In accordance with the present invention these difficulties are overcome by using conection means in the form of circumferentially expansible resilient means operated upon by axial compression means to form a solid connection between the rotating members to be connected, with the connection arranged to be subjected mainly to compressive and shearing forces. The opening between the rotating members to be connected together is so solidly and completely filled by the connection means of our invention that a rigid connection is obtained considered tangentially, radially, or axially, without any play when subjected to rotational or other forces in any direction.

Further objects, advantages and details of the invention will become apparent as the following detailed description of present preferred embodiments of the invention proceed. In the accompanying drawings.

Figure 1:
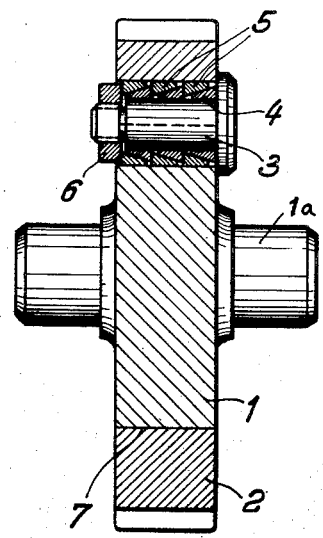
Figure 1 shows a section through the axis of a shaft mounting a hub connected by means in accordance with the invention to a gear around the hub.
Figure 2:
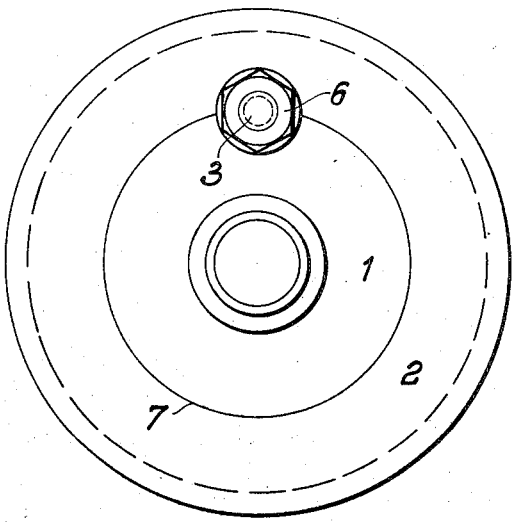
Figure 2 shows a view endwise of the shaft, taken from the left of Figure 1.
Figure 4:
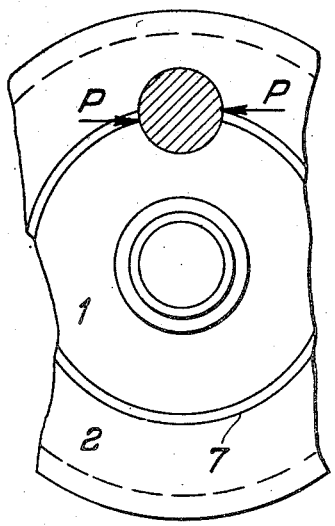

Figure 4 corresponds to Figure 2 but shows a force diagram in place of the connection means, and exaggerates the seam between the hub and gear;

Figure 5 is a section like that of Figure 1, but with the connection means omitted to show a modification of the engaging surfaces of the members to be connected; and Figure 6 is a section showing two gears and a shaft hub connected by a modified embodiment of the invention.

(Figures 5 and 6 are the only figures intended to be shown on the second sheet of the drawings.)

Figure 3:
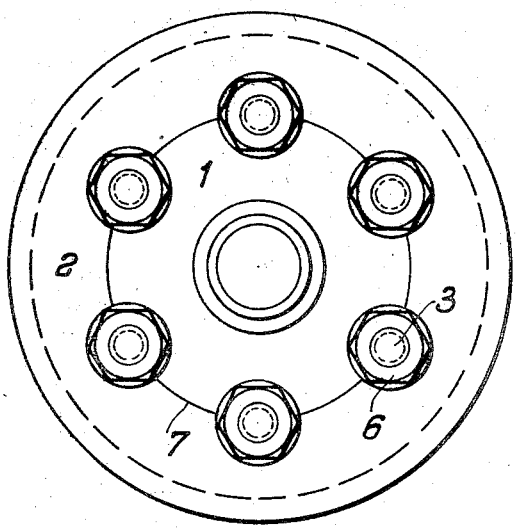
Figure 3 is a view corresponding to Figure 2 but showing a modified embodiment of the invention with a plurality of the single connecting means shown in Figures 1 and 2.

Referring now more particularly to the drawings, and initially to Figures 1 and 2, there is provided a power shaft 1a with integral hub 1 therearound. The cylindrical outer surface of the hub 1 fits closely within the cylindrical inner surface 7 of a gear 2 which has outwardly extending teeth (the root line is indicated by a circular dotted line in Figure 2). The hub 1 and gear 2 are locked together by a set of ring springs which are each preferably fully circular, and which consist of a series of inner rings 4 and outer rings 5 with interengaging conical surfaces which tend to expand the outer rings 5 and to contract the inner rings 4 when the set of rings is subjected to axial compression at its opposite ends. The rings 5 when axially uncompressed fit slidably into a cylindrical opening bored through the hub 1 and gear 2 where they join along the surface 7, the axis of the opening being parallel to the axis of rotation of the shaft 1a. A bolt 3 extends through the inside of the inner rings 4, and the head at one end of the bolt 3 engages the adjacent one of the inner rings 4 while a nut 6 screwed on the opposite end of bolt 3 engages an adjacent one of the outer rings 5 for purposes of applying and relieving axial pressure on the set of rings when the nut 6 is screwed toward and away from the set of rings. When the nut 6 is tightened on the rings the inner rings 4 contract against the shank of bolt 3, and the outer rings 5 expand against the hub 1 and gear 2. The result is a solid connection without any play whatever between hub 1 and gear 2 where the connection is inserted between the hub and gear. Moreover, the expansion of rings 5 tightens the connection between hub 1 and gear 2 where they engage elsewhere along the surface 7, especially on the other side of the shaft 1a from the rings 5. Since the axis of the opening for the rings 5 lies in a continuation of the cylindrical plane of the surface 7, the torque forces between hub 1 and gear 2 act in shear on the ring connection, as indicated diagrammatically in Figure 4, and large rotational power forces can be safely transmitted. While the axis of the bolt 3 is shown passing through the continuation of the cylindrical plane of surface 7, it can also be displaced within small limits on either side thereof. When required by increased torque loads, a plurality of sets of the connection means can be used, as illustrated in Figure 3.

In Figure 4 the cylindrical seam between hub 1 and gear 2 is exaggerated for purposes of illustration. To avoid any such separation even on a slight scale resulting from diameter differences of the members to be joined, which might have bad corrosive effects if exposed to weather, the seam between the members to be joined can advantageously be made conical. In Figure 5 the hub 9 and gear 10 are shown with conical interengaging surfaces 8, and with an opening 11 through the hub 9 and gear 10 where they join along the surfaces 8 for purposes of receiving the same form of connection means 3—6 shown in Figures 1 and 2. Such connection means, when used in the opening provided therefor through hub 9 and gear 10, are effective not only to lock said members together for transmission of rotary power therebetween, but also to hold them securely together against axial separation along their conical interengaging surfaces.

In the modified embodiment shown in Figure 6, a shaft hub 12 and surrounding gear 13 are shown with conical interengaging surfaces 15. A larger gear 14 is placed with its side against the adjacent end of the hub 12 and gear 13, and a plurality of openings are bored parallel to the axis of hub 12 through the gear 14 and thence through the hub 12 and gear 13 where they join along their interengaging surfaces 15. A connection is inserted in each of said openings, consisting of a resilient outer ring 17 having a cylindrical outer surface and oppositely tapering inner surfaces respectively engaging the outer conical surfaces of a pair of inner rings 16, all of said rings 16 and 17 being resiliently and preferably extending in unbroken circles. The shank of a bolt 18 extends through the inner rings 16, and the head of the bolt 18 engages the outer edge of one of the rings 16, while a nut 19 screwed on the end of the bolt 18 is adapted to engage the outer edge of the other ring 16 for purposes of applying and relieving axial pressure on the rings 16 in order to expand the outer ring 17 against the hub 12 and gears 13 and 14 while the inner rings 16 are compressed circumferentially against the shank of the bolt 18, and to relieve axial pressure upon the rings 16 so that they and the ring 17 may relax and release the gripping pressure on each other and on the hub 12 and gears 13 and 14. With this connection the shearing forces are not only exerted on the connection parallel to the axis of rotation, but also perpendicular to the axis of rotation along the plane between the gear 14 and adjacent hub and gear to which it is connected.

The connection of the invention is useful not only to connect metallic members but also members made of other materials, such as synthetic and composition materials, and to connect members of different materials, such as gears of pressed material with shaft bodies of steel and the like. Moreover, the connection of the invention is readily removable without injury to itself or the adjacent parts, by relieving axial pressure on the expansible members of the connection. This is an important advantage, because with many conventional connections, such as notch pins, for example, it is often necessary to use force to remove the connection, or even to bore it out, with the result that the opening for the connection must be enlarged before a new connection can be inserted. The result is a weakening of the members to be connected, in addition to trouble and expense, the first of which is avoided, and the other minimized, in accordance with our invention.

While we have shown and described certain present preferred embodiments of the invention and methods of practicing the same, it will be recognized that the invention is not limited thereto but may be otherwise variously embodied and practiced without departing from the spirit of the invention or the scope of the following claims.

We claim:

1. In combination, a plurality of members rotatable about a common axis and having an entirely circular opening extending through them parallel to and radially offset from their axis of rotation, at least one resilient ring in said opening and radially expansible against each of said members to lock them together for transmission of rotary power therebetween, wedging means within said ring to wedge it radially outwardly against said members, and means to axially compress said wedging means to cause it to expand said ring.

2. In combination, a pair of concentric members rotatable about a common axis with cylindrical interengaging surfaces therebetween and with a cylindrical opening extending through them parallel to their axis of rotation and intersecting their said interengaging surfaces, a resilient ring in said opening and radially expansible against both said members, wedging means within said ring for expanding it radially outwardly against said members, and means for applying axial pressure on said wedging means to cause it to expand said ring.

3. In combination, a pair of concentric members rotatable about a common axis with conical interengaging surfaces therebetween and with a cylindrical opening extending through them parallel to their axis of rotation and intersecting said conical interengaging surfaces, a resilient ring in said opening and radially expansible against both said members, wedging means within said ring for expanding it radially outwardly against said members, and means for applying axial pressure on said wedging means to cause it to expand said ring.

4. In combination, a pair of concentric members rotatable about a common axis, said members having circular interengaging surfaces and having a cylindrical opening extending through them parallel to and radially offset from their axis of rotation and intersecting said interengaging surfaces, outer resilient ring means in said opening and radially expansible against both of said members to lock them together for transmission of rotary power therebetween, inner resilient ring means, said outer and inner resilient ring means having conical interengaging surfaces whereby axial compression on the set of inner and outer ring means expands the outer ring means against said members and contracts the inner ring means, and means to apply and relieve axial compression on the set of ring means, said axial compression means including a solid portion extending through the inner rings means and gripped by the inner ring means when axially compressed.

References Cited in the file of this patent

UNITED STATES PATENTS

| | | |
|---|---|---|
| 1,392,915 | Clendenon | Oct. 11, 1921 |
| 1,670,381 | Rogers | May 22, 1928 |
| 2,573,928 | Peter | Nov. 6, 1951 |
| 2,594,220 | Rozett | Apr. 22, 1952 |